Dec. 16, 1924.                                                                   1,519,482
J. A. BOWERMAN ET AL
MANUFACTURE OF BEAD FILLERS
Filed Aug. 17, 1922        6 Sheets-Sheet 1

INVENTORS
Joseph A. Bowerman,
Thomas Midgley,
Martin Cartwright
BY
Edward C. Taylor
ATTORNEY

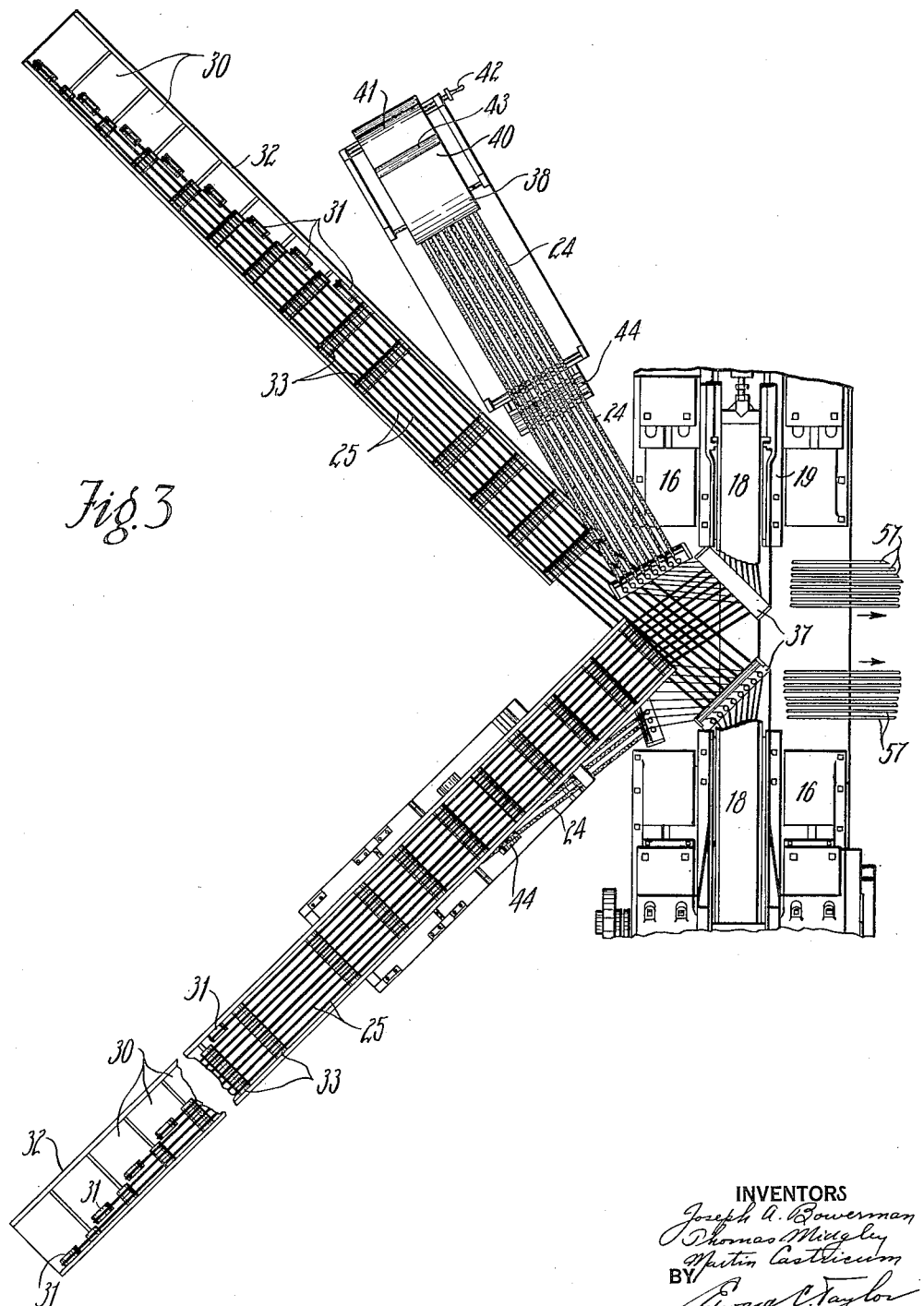

Dec. 16, 1924.　　　　　　　　　　　　　　1,519,482
J. A. BOWERMAN ET AL
MANUFACTURE OF BEAD FILLERS
Filed Aug. 17, 1922　　　　6 Sheets-Sheet 3

INVENTORS
Joseph A. Bowerman
Thomas Midgley
Martin Castricum
BY
Edward C. Taylor
ATTORNEY

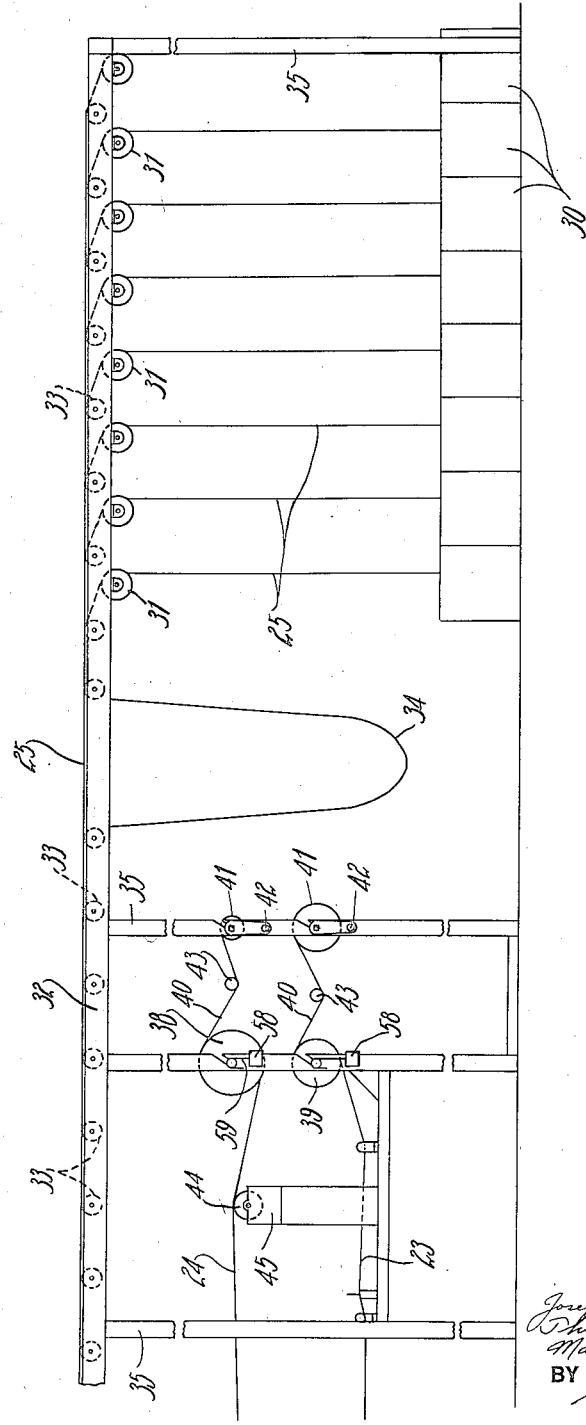

Dec. 16, 1924.
J. A. BOWERMAN ET AL
MANUFACTURE OF BEAD FILLERS
Filed Aug. 17, 1922    6 Sheets-Sheet 5
1,519,482
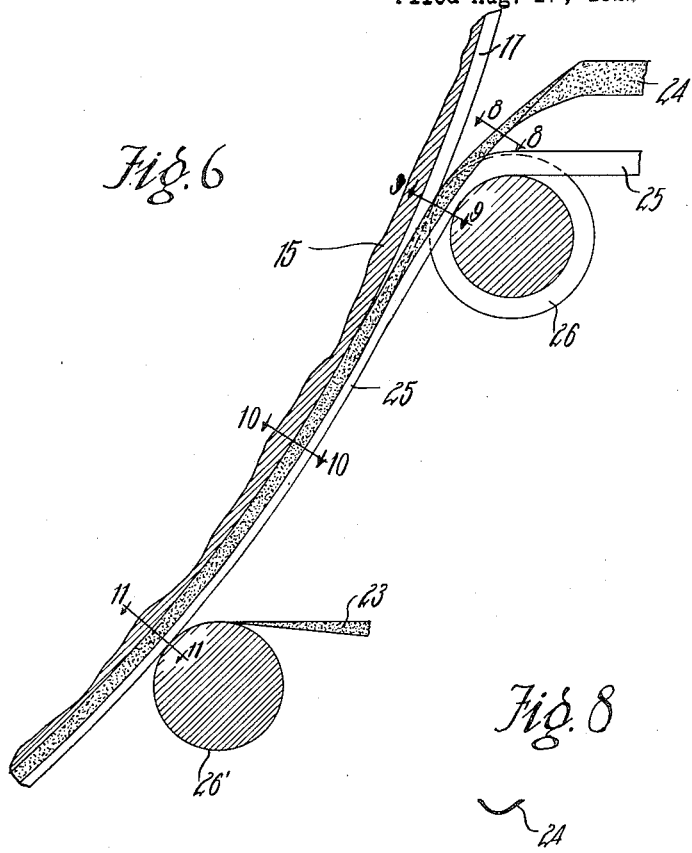
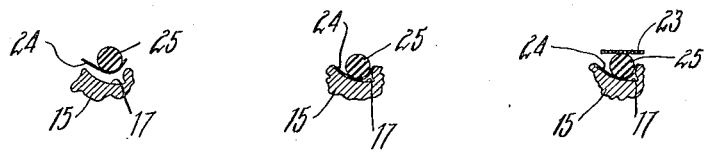
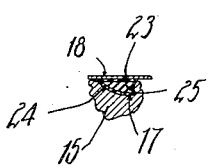
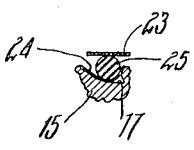
INVENTORS
Joseph A. Bowerman
Thomas Midgley
Martin Casterium
BY
Edward C. Taylor
ATTORNEY

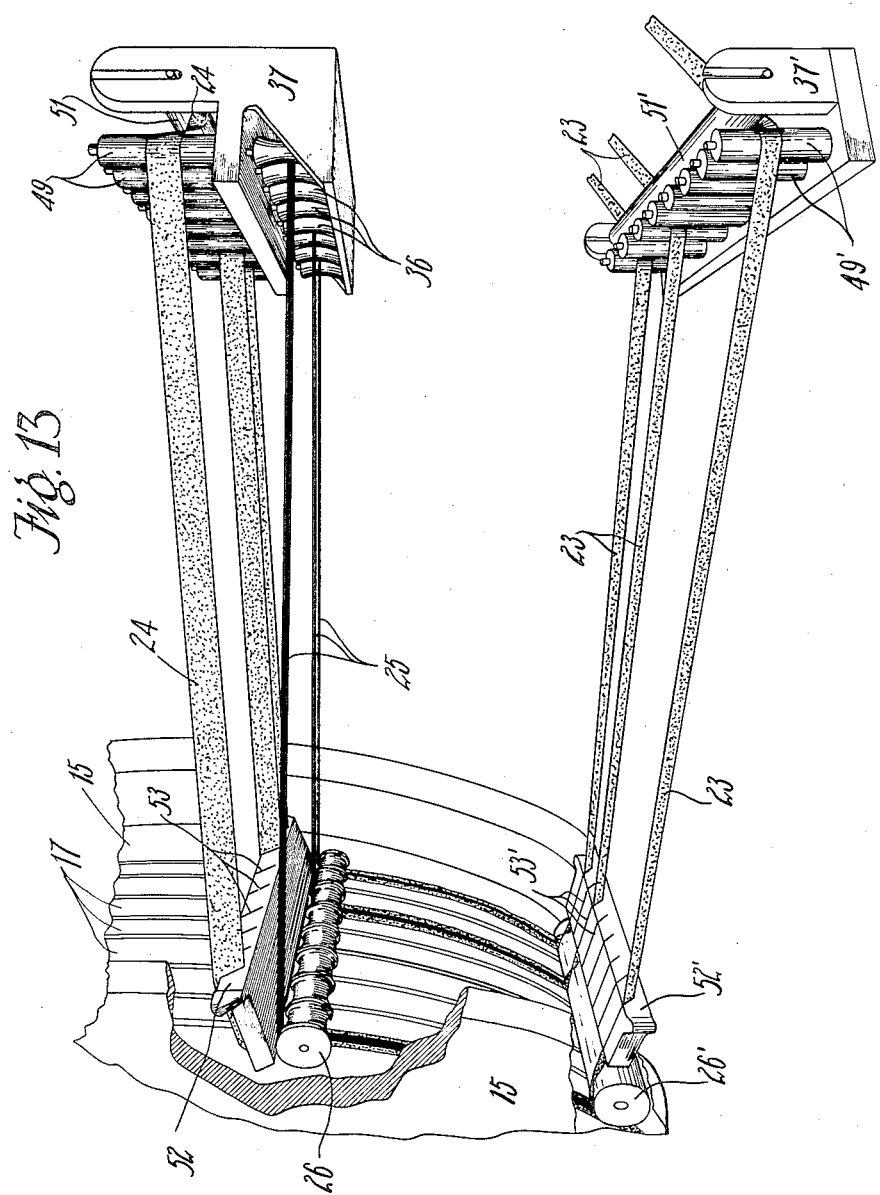

Patented Dec. 16, 1924.

1,519,482

UNITED STATES PATENT OFFICE.

JOSEPH A. BOWERMAN, OF WILBRAHAM, THOMAS MIDGLEY, OF HAMPDEN, AND MARTIN CASTRICUM, OF SPRINGFIELD, MASSACHUSETTS, ASSIGNORS TO THE FISK RUBBER COMPANY, OF CHICOPEE FALLS, MASSACHUSETTS, A CORPORATION OF MASSACHUSETTS.

MANUFACTURE OF BEAD FILLERS.

Application filed August 17, 1922. Serial No. 582,523.

*To all whom it may concern:*

Be it known that we, JOSEPH A. BOWERMAN, residing at Wilbraham, county of Hampden, State of Massachusetts, THOMAS MIDGLEY, residing at Hampden, county of Hampden, State of Massachusetts, and MARTIN CASTRICUM, residing at Springfield, county of Hampden, State of Massachusetts, have invented certain new and useful Improvements in the Manufacture of Bead Fillers, of which we declare the following to be a full, clear, and exact description.

The present invention relates to the manufacture of combined rubber and fabric articles such, for example, as the bead fillers used in pneumatic tire casings of the clincher type. It has for its object the provision of a method and an apparatus whereby such articles may be covered with fabric and vulcanized as a single operation and with a minimum of labor. It has various other objects which will appear from the following description and claims.

The invention will now be described with reference to the accompanying drawings, in which—

Fig. 3 is a top plan view showing one manner of feeding the raw bead core and the covering material to the vulcanizing drum;

Fig. 5 is a side elevation illustrating one of the material feeding racks;

Fig. 6 is a fragmentary section illustrating the operation of applying covering material to the bead core;

Fig. 7 is a detail looking from the right in Fig. 6;

Figure 2:
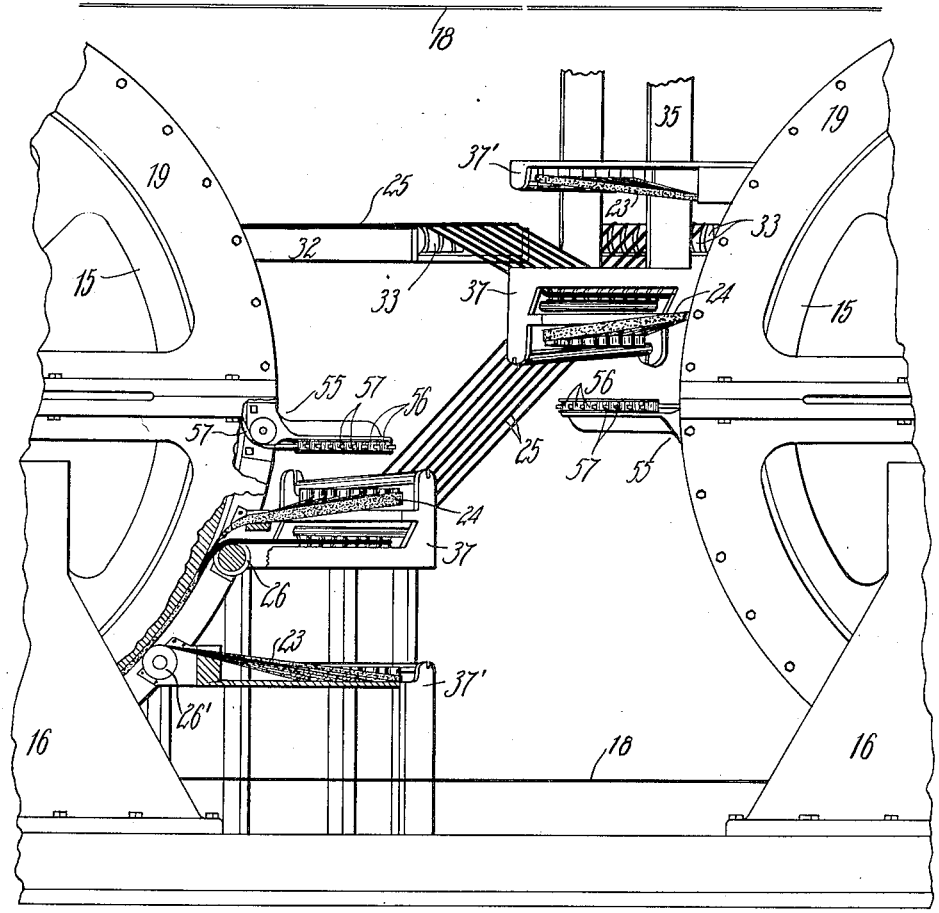
Fig. 2 is a fragmentary side elevation thereof on a larger scale.
Figure 1:
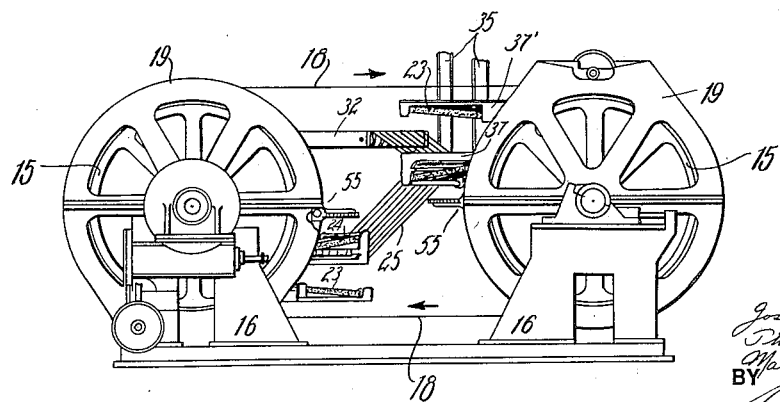
Fig. 1 is a side elevation of a machine illustrating the invention.
Figures 4, 14:
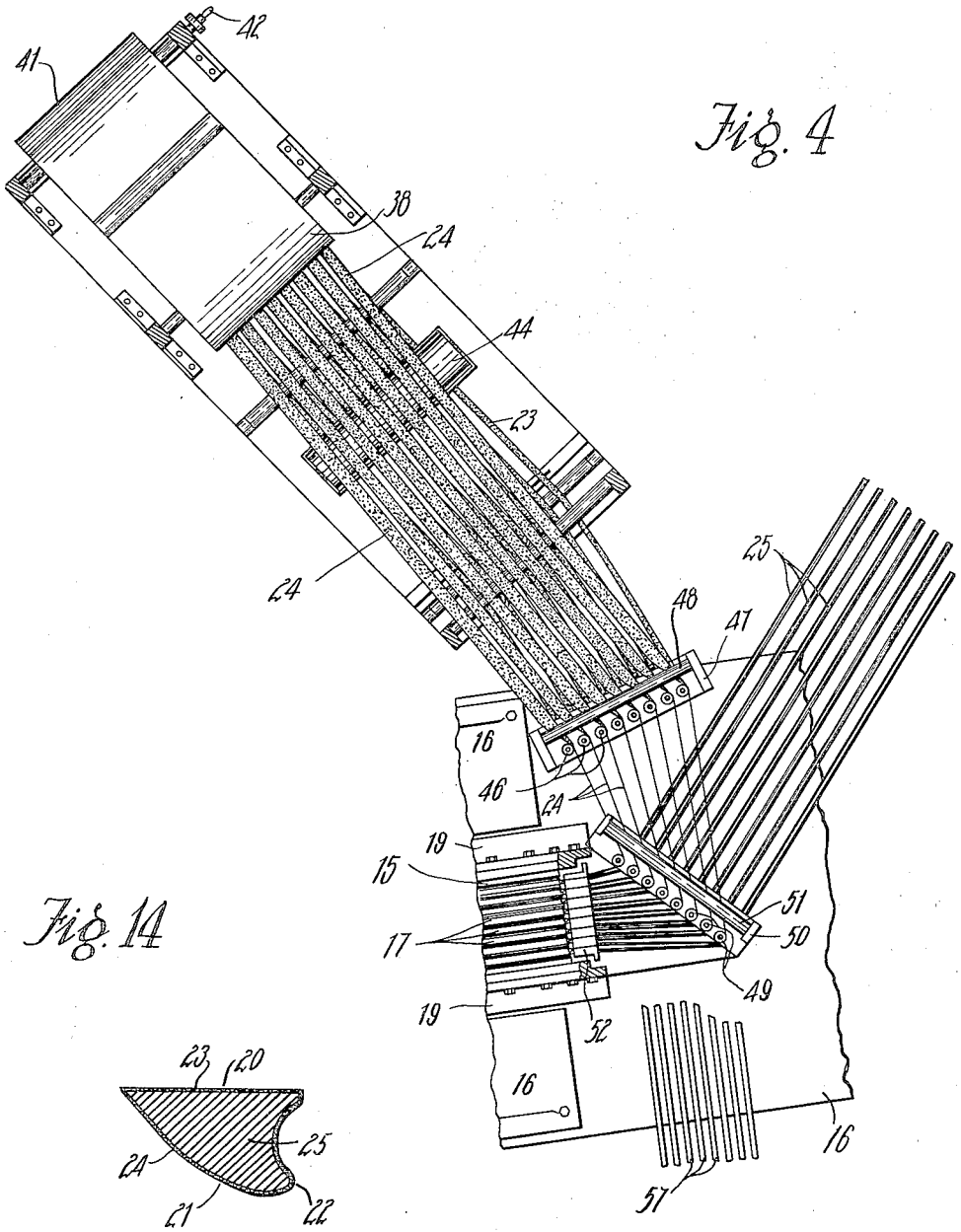
Fig. 4 is a fragmentary similar view on an enlarged scale showing the feeding of material to that vulcanizing drum at the bottom in Fig. 3.

Fig. 8 is a section on line 8—8 of Fig. 6;
Fig. 9 is a section on line 9—9 of Fig. 6;
Fig. 10 is a section on line 10—10 of Fig. 6;
Fig. 11 is a section on line 11—11 of Fig. 6;
Fig. 12 is a section similar to Fig. 11 but showing the elements at a later stage of rotation of the vulcanizing drum, with the covered bead filler compressed into the mold cavity by the action of the presser band;

Fig. 13 is a perspective detail showing the manner of supplying the material to the molding grooves; and Fig. 14 is a cross section of a covered and vulcanized bead filler.

The present method and apparatus is adapted for use with a machine for vulcanizing bead fillers set forth in a patent granted February 13, 1923, to Thomas Midgley, No. 1,445,533. This machine comprises two vulcanizing drums 15, suitably journaled in standards 16 and provided with a plurality of annular molding grooves 17 (Figs. 4 and 9) in their peripheries. A metal belt or band 18, such as is used in band-saws, extends tightly around both drums and serves to press the material to be vulcanized into the molding grooves. One drum is rotated either constantly or intermittently by any suitable mechanism, of which one form is described in said Midgley patent, the metal belt serving to transmit the motion to the second drum. Each drum is hollow, and provided with piping whereby steam may be circulated through it. A casing 19 surrounds each drum, and provides additional heating surface around the outside of the belt. The speed at which the drums are rotated is so chosen that the material will remain under the vulcanizing heat for a time sufficient to produce the desired degree of vulcanization. The details of construction of this portion of the mechanism need not be further discussed here, as they are described in the Midgley patent referred to. It may be remarked, however, that in covering and vulcanizing beads according to the present invention, the presser-foot described in that patent for pressing the bead filler into the molding cavity prior to coming under the belt 18, is preferably, but not necessarily, omitted.

The method of supplying the material to the molding cavities can best be described in connection with Figs. 6 to 13. The bead filler as prepared for incorporation in the tire shoe has one flat side 20 (Fig. 14), and a curved side 21 formed with a heel 22 giving shape to the clinch of the tire. According to the manner of covering the filler herein used, a strip of bias cut fabric 23 is used to cover the flat side 20, and a second strip 24 to cover the curved side 21. The molding grooves 17 are formed to correspond with the curved side of the filler, while the band 18 presses against the flat side.

The wider strip 24 is first directed (Figs. 6 and 13), by guiding means which will be described, into registration with the raw bead core 25 which is conveniently guided by means of a grooved roller 26. Strip 24 is preferably supplied under tension, so that it gradually curves and shapes itself around the core, as indicated in Figs. 8 and 9. As they progress further around the circumference of the drum, the strip and core will gradually slip into the groove, as indicated in Fig. 10. Strip 23 is then led, as over a smooth surfaced roller 26', into contact with the core (Fig. 11) and all three members are pressed into the molding groove as they pass under the belt, with the result indicated in Fig. 12. The change in shape from the roundness of the original bead core to the curve of the finished bead filler is accompanied by an increase in the transverse perimeter, as a circle has the least perimeter of any figure of the same area. If the core were covered completely by fabric while in the round form, this increase in perimeter would cause either the fabric to be stretched or the rubber of the core to be forced through the meshes of the fabric. By supplying the fabric in two pieces, the perimeter of the core is not restricted and the core can flow to its molded shape without restriction. It is also desirable to have that side of the first fabric strip adjacent the heel of the filler unattached to the bead core, as this portion of the core undergoes so much distortion during molding that the fabric might become pinched between the mold drum and the band or otherwise displaced in case this precaution were not taken. After the assembled filler has passed around the drum beyond the arc of contact of the belt, it is led away, and may be trimmed, buffed, and cemented or treated in any desired manner preparatory to being incorporated in a tire casing. The fillers are thus covered and vulcanized in continuous lengths, the bead cores 25 and the fabric strips being spliced before they pass into the mechanism. Covering and vulcanizing are carried out as a single continuous operation with a minimum of labor.

One form of supplying and guiding devices for the material will now be described. The bead cores 25 are supplied from a series of containers 30 (Figs. 3 and 5) and pass over rollers 31 along a conveyor 32 formed with rollers 33. These latter rollers may be positively driven, if the soft nature of the cores or the friction of the rollers makes this precaution desirable to prevent stretching, but usually the cores have sufficient strength so that they may be drawn over the anti-friction rollers by the rotation of the vulcanizing drums. In order to relieve the cores of as much strain as possible, which might cause them to be drawn down under the size intended, it is preferable, particularly if the vulcanizing drums are rotated intermittently as in the Midgley patent referred to, to have the machine draw the cores from a slack loop 34. This loop can conveniently be formed between two adjacent rollers on the conveyor and maintained by the operator pulling the cores from the containers at intervals. This, of course, could be done by power if desired, but on account of the sticking of adjacent turns of the cores together as they lie in the containers it is generally desirable to have the flexibility of manual operation at this point in order to avoid sporadic stretching, resulting in an irregular finished product. A separate one of these conveyors 31 is mounted, as shown in Fig. 3 for example, so as to deliver its bead cores to each of the two drums, the two conveyors being mounted at different heights on standards 35 to direct the cores to the vulcanizing drums at the proper points. After leaving the conveyors the cores pass between guide rollers 36 journaled in a bracket 37, and thence pass to the grooved guide roller 26 previously mentioned.

The two sets of fabric strips for each vulcanizing drum are supplied on spools 38 and 39 (Fig. 5) being conveniently wound between turns of liners 40 serving to prevent the rubberized fabric sticking to itself. The liner may be wound up in each case by any suitable devices, that shown being merely a spool 41 rotatable by means of a crank 42, preferably under sufficient resistance to prevent unwinding of the liner from the wind-up spool under the influence of a floating roller 43 resting on the liner between spools 39 or 39 and 41. This floating roller maintains an even tension on the liner at all times, sinking into a loop of the liner as the latter accumulates, and necessitating only occasional attention by the operator in winding the loop upon spool 41.

In order to assure that the assembly, comprising the bead core with the covering strips of fabric, will seat properly in the molding cavity it is desirable to lubricate that surface of strip 24 which comes in contact with the mold. As one method of accomplishing this a soap roll 44 (Fig. 5) has been shown mounted in a tank 45 containing liquid soap such as is customarily used for lubricating various vulcanizing molds. The soap causes the fabric to slip readily into place in the cavity, and is sufficiently fugitive so that it causes no difficulty in the later handling of the product.

After strips 24 leave the soap roll, they pass around vertical rollers 46 (Fig. 4) mounted on a bracket 47, a horizontal roller 48 on the same bracket serving to keep all the strips in alignment. From these rolls the strips pass around vertical rollers 49 on a bracket 40, a horizontal roller 51 serving the same purpose as roller 48. This latter set of guiding rollers 49 presents the strips to a guide 52 which turns the strips and directs them into contact with the bead core on roller 26 (Fig. 13). This guide is conveniently constructed as a block having slanting slots 53, which partially turn the strips and register them so that they will be properly placed on bead core 25. One edge of each strip lies against the bottom of its slot 53, which causes the strips to be guided with that edge in proper registration to the bead core and without danger of buckling, irrespective of variations in the width of the strips. The tension under which the strips are preferably placed causes them to curve so as to partially conform to the bead core on roller 26 (Figs. 6, 8, and 9), and as the bead core is then gradually drawn by a coaction of the various parts into the molding groove the strip 24, thus properly registered upon it, will be pressed into the molding groove in proper registered relation.

The second strips 23 are handled in much the same way as the strips 24, except that they need not be soaped, and for convenience of comparison the various guiding rollers have been designated by primed numerals. After leaving the guide 52', strips 23 pass over roll 26' previously described, which causes them to lie smoothly upon the surface of the bead core 25.

The assembled bead fillers pass around a semi-circumference under pressure between the band and the drum as the latter is slowly rotated, and may then pass around an additional arc while in contact with the drum only, in order to give additional vulcanization. This brings the fillers to the point 55, where they are delivered from the wheel by rollers 56 to any desired point. In Figs. 3 and 4 the covered and vulcanized fillers 57 are shown broken away in order not to confuse the showing of other parts.

Any suitable device may be employed for giving the desired degree of tension to the strips. Preferably only strips 24 are directed to the drum under any tension greater than necessary to preserve tautness, and for one form of mechanism capable of accomplishing this result a weight 58 (Fig. 5) has been shown attached to a band of fabric 59 fixed to the frame and passing over the axle of the spool. Any other suitable tension device could be substituted if desired.

The arrangement of guiding devices shown presents advantages in the way of compactness and convenience. The guiding devices for the fabric strip are arranged, in order to avoid confusion, in diverging arrangement at one side of the machine, and with the two sets of strips supplied to either drum mounted on the same standard. The feeding devices for the bead cores are preferably arranged (see Fig. 3) so as to feed the cores as straight as possible to the guiding devices adjacent the drums, while the fabric supplying devices are so arranged as to cause the fabric to turn at an acute angle and pass to the drum beside which the supplying spool is located, in order not to cause confusion between the two sets of strips. The delivery of cured bead fillers is made from the side of the drum opposite that on which the feeding devices are located.

While the arrangement of guiding devices has been described in some detail, it will be understood that other devices and arrangements may be substituted for those shown, provided they direct the material as may be desired to the vulcanizing drums. furthermore, one of the covering strips may be omitted if a bead filler only partially covered is desired, and the width of the strips may be varied according to the product to be made.

Having thus described our invention, we claim:

1. An apparatus for making bead fillers for tire casings, which comprises in combination a bead covering means and a bead vulcanizing mold adapted by simultaneous action to cover the bead and shape it as it is being covered by pressing the materials into said mold, including pressure means to cooperate with the mold and the covering means.

2. An apparatus for making bead fillers for tire casings comprising a drum having a molding groove therein, means for applying a lubricant to a strip of covering material, means for directing the strip to the groove with the lubricated side against the surface of the drum, means for directing a bead core to said material, and pressure means for forcing the assembly into the groove.

3. An apparatus for making bead fillers for tire casings comprising a drum having a molding groove therein, means for applying a lubricant to a strip of covering material, means for tensioning the strip, means for directing the strip to the groove with the lubricated side towards the surface of the drum, means for directing the bead core to said material, and pressure means for forcing the assembly into the groove.

4. An apparatus for making bead fillers for tire casings comprising a drum having a molding groove therein, means for applying a lubricant to a strip of covering material, means for tensioning the strip, means for directing the strip to the groove with the lubricated side towards the surface of the drum, means for directing a bead core to said material, means for directing a second strip to the uncovered side of the filler, and pressure means for forcing the assembly into the groove.

5. An apparatus for making bead fillers for tire casings comprising a drum having a molding groove therein, a pressure band encircling a portion of the drum, means for directing a strip of covering material to the groove, means for directing a bead core to said strip, and means for directing a second strip of covering material to said bead core, all said means being constructed and arranged to cause the bead core and covering material to be pressed into the molding groove by the band.

6. An apparatus for making bead fillers for tire casings comprising means for partially covering a bead filler with fabric, and means for drawing the bead fillers from the covering mechanism and vulcanizing them, said last-named means being constructed to complete the covering of the bead fillers.

7. A vulcanizing device comprising in combination a pressure mold, means to direct vulcanizing material to a position in the mold, and means to secure tension in covering material as fed between the mold and said vulcanizing material, said last mentioned means being arranged so as to cause the tension to act against the form of the vulcanizing material and shape it partially thereto before it enters the mold.

8. The combination of a vulcanizing machine for composite articles of fabric and rubber comprising two vulcanizing mold drums, a mold closing belt connecting them and mounted for rotation with them, means at one side of said drum to supply rubber cores and covering material in proper relation to the molds during their rotation, including two core supplies arranged at an angle one to the other and to the plane of the mold drums and at different levels one to the other, two fabric covering supplies arranged in a similar manner but at different levels one to the other as well as to the core supplies, and guides between said supplies and the open peripheries of the drum molds, adapted to feed the cores with the covering material shaped thereto in tangential relation to the molds.

9. The combination of a vulcanizing machine for composite articles of fabric and rubber comprising two vulcanizing mold drums, a mold closing belt connecting them and mounted for rotation with them, means at one side of said drum to supply rubber cores and covering material in proper relation to the molds during their rotation, including two core supplies arranged at an angle one to the other and to the plane of the mold drums, two fabric covering supplies arranged in a similar manner, and guides between said supplies and the open peripheries of the drum molds, adapted to feed the cores with the covering material shaped thereto in tangential relation to the molds.

10. The combination of a vulcanizing machine for composite articles of fabric and rubber comprising two vulcanizing mold drums, a mold closing belt connecting them and mounted for rotation with them, and means at one side of said drum to supply means at one side of said drum to supply and guide rubber cores with separate covering material therefor in proper tangential relation to the molds during their rotation.

11. An apparatus for making bead fillers for tire casings which comprises a vulcanizing mold, means for directing a strip of bead covering material to the mold, a guide for positioning a bead core thereon so as to leave unattached at least one side of the covering strip, and a pressure member for forcing the core and covering strip into the mold.

12. An apparatus for making bead fillers for tire casings, which comprises a vulcanizing a mold, means for directing a strip of bead covering material to the mold, a guide for positioning a bead core thereon so as to leave unattached at least one side of the covering strip, a guide for positioning a second strip of covering material thereon, and a pressure member for forcing the core and the first mentioned covering strip into the mold.

13. A method of molding bead fillers which comprises placing a strip of bead covering material adjacent the opening of a mold, placing an unformed bead core thereon so that only the portion of the bead core adjacent the mold is initially attached to the covering material, and forcing both core and covering into the cavity to simultaneously cover the core and form the filler.

14. A method of molding clincher bead fillers which comprises locating a strip of bead covering material adjacent the opening of a mold formed to the curved side of the filler, placing a bead core thereon so that the side of the strip is left free, placing a second strip of covering material on the core, and pressing the assembly into the mold, whereby the first strip is caused to cover the curved side of the filler and the second strip to cover the flat side of the filler.

15. A tire bead making machine comprising a bead shaping mold, means to guide bead filling material to the mold, means to guide bead covering material between the mold and said filling material, pressure means to simultaneously force both materials into the mold and join them while they are being shaped to bead form, and means to move the mold to the pressure means as said materials are being guided to said mold.

16. An apparatus for making bead fillers for tire casings which comprises an annular mold, pressure means coacting with the mold to form bead fillers, and devices for leading to the mold before coaction with the pressure means, in order, a strip of covering material, a bead core, and a second strip of covering material.

17. An apparatus for making a bead filler having a curved and a flat side, which comprises a rotatable drum having an annular groove therein shaped to form the curved side of the bead filler, a band passing around a portion of the periphery of the drum and pressed tightly against it to form the flat side of the bead filler, and devices for directing to the drum, in order, a strip of covering material adapted to cover the curved side of the filler, a bead core, and a strip of covering material adapted to cover the flat side of the bead filler.

18. An apparatus for making bead fillers for tire casings, which comprises progressively acting mold means for vulcanizing bead fillers, and devices for assembling on said mold means the ununited component parts of the bead filler prior to molding and vulcanizing.

19. An apparatus for making bead fillers for tire casings comprising a mold having a continuous open groove, progressively acting means for closing said groove with a molding pressure, and devices for assembling in the groove the ununited component parts of a bead filler.

20. An apparatus for making composite articles which comprises progressively acting molding and vulcanizing means, devices for directing a core and covering material therefor to said means, and means for applying a lubricant to the covering material before contact with the molding means.

JOSEPH A. BOWERMAN.
MARTIN CASTRICUM.
THOMAS MIDGLEY.